(12) United States Patent
Zhang et al.

(10) Patent No.: US 9,111,560 B1
(45) Date of Patent: Aug. 18, 2015

(54) DYNAMIC CONFIGURATION OF SEEK RECOVERY IN A DISK DRIVE

(71) Applicant: Seagate Technology LLC, Cupertino, CA (US)

(72) Inventors: GuoQing Zhang, Singapore (SG); Mingzhong Ding, Singapore (SG); KianKeong Ooi, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/605,076

(22) Filed: Jan. 26, 2015

(51) Int. Cl.
*G11B 5/55* (2006.01)

(52) U.S. Cl.
CPC ............ *G11B 5/5565* (2013.01); *G11B 5/5547* (2013.01)

(58) Field of Classification Search
None
See application file for complete search history.

(56) References Cited

U.S. PATENT DOCUMENTS

| | | | |
|---|---|---|---|
| 5,696,646 A * | 12/1997 | Satoh | 360/78.04 |
| 5,721,816 A | 2/1998 | Kusbel et al. | |
| 6,084,733 A * | 7/2000 | Ohzeki et al. | 360/53 |
| 7,002,765 B2 | 2/2006 | Lum et al. | |
| 7,113,363 B2 * | 9/2006 | Saito | 360/78.04 |
| 7,276,874 B2 * | 10/2007 | Aoki et al. | 360/75 |
| 7,500,153 B2 | 3/2009 | Jun | |
| 7,626,782 B1 * | 12/2009 | Yu et al. | 360/78.04 |
| 8,125,729 B2 * | 2/2012 | Ohzeki et al. | 360/78.04 |
| 8,139,449 B2 * | 3/2012 | Kim | 369/30.11 |
| 8,467,144 B2 * | 6/2013 | Lim et al. | 360/78.05 |
| 8,645,641 B2 * | 2/2014 | Baum et al. | 711/154 |
| 8,786,978 B2 * | 7/2014 | Akiya | 360/75 |
| 8,958,169 B1 * | 2/2015 | Huang et al. | 360/75 |
| 8,972,816 B2 * | 3/2015 | Ozturk et al. | 714/758 |
| 2012/0281311 A1 * | 11/2012 | Ishihara et al. | 360/78.06 |

* cited by examiner

*Primary Examiner* — Wayne Young
*Assistant Examiner* — James L Habermehl
(74) *Attorney, Agent, or Firm* — Hollingsworth Davis, LLC (57) ABSTRACT

An apparatus comprises a controller configured to detect a seek failure of a read/write head. The controller is additionally configured to perform a seek recovery operation in accordance with a recovery sequence in response to the seek failure; the recovery sequence comprising a plurality of recovery procedures. Further, the controller is configured to determine if the seek recovery operation is successful and determine which of the recovery procedures provided the success. And, the controller is configured to dynamically calculate the success rate of each recovery procedure, modify the recovery sequence based on the success of the seek recovery operation and based on the success rate of recovery procedures providing the success.

20 Claims, 10 Drawing Sheets

FIG. 1

Original Seek Recovery Table:                                    Table Entry

RECOVERY_METHOD_EXTEND_SEEK_TIME_OUT ,                            0,0,0
RECOVERY_METHOD_EXTEND_SEEK_TIME_OUT ,                            0,1,0
RECOVERY_METHOD_CLEAR_ACFF_1X | RECOVERY_METHOD_EARLY_ACFF ,      0,2,0
RECOVERY_METHOD_CLEAR_ACFF_ALL ,                              0,2,1
RECOVERY_METHOD_ACFF_UNDO | RECOVERY_METHOD_EXTEND_SEEK_TIME_OUT ,  0,2,2
RECOVERY_METHOD_FREE_HEADS ,                                      0,3,0
RECOVERY_METHOD_RV_GAIN_TO_DEFAULT | RECOVERY_METHOD_LV_GAIN_TO_DEFAULT , 0,4,0
RECOVERY_METHOD_RV_GAIN_TO_ZERO | RECOVERY_METHOD_LV_GAIN_TO_ZERO , 0,4,1
RECOVERY_METHOD_RV_GAIN_UNDO | RECOVERY_METHOD_LV_GAIN_UNDO ,     0,4,2
RECOVERY_METHOD_EXTEND_SEEK_TIME_OUT ,                            0,5,0

FIG. 2

| Field Number | Field 1 | Field 2 | Field 3 | Field 4 |
|---|---|---|---|---|
| Description | Instruction(s) | Success counter | Group index | Group member priority |
| Defined as | | u16_SuccessCounter | u8_GroupIndex | u8_GroupMemberPriority |
| Example 1 | RECOVERY_METHOD_EXTEND_SEEK_TIME_OUT | 0 | 0 | 0 |
| Example 2 | RECOVERY_METHOD_CLEAR_ACFF_ALL | 0 | 2 | 1 |

Original Seek Recovery Table:

| | Table Entry | Success Rate |
|---|---|---|
| RECOVERY_METHOD_EXTEND_SEEK_TIME_OUT, | 0,0,0 | |
| RECOVERY_METHOD_EXTEND_SEEK_TIME_OUT, | 0,1,0 | |
| RECOVERY_METHOD_CLEAR_ACFF_1X | RECOVERY_METHOD_EARLY_ACFF, | 0,2,0 | |
| RECOVERY_METHOD_CLEAR_ACFF_ALL, | 0,2,1 | |
| RECOVERY_METHOD_ACFF_UNDO | RECOVERY_METHOD_EXTEND_SEEK_TIME_OUT, | 0,2,2 | |
| RECOVERY_METHOD_FREE_HEADS, | 0,3,0 | |
| RECOVERY_METHOD_RV_GAIN_TO_DEFAULT | RECOVERY_METHOD_IV_GAIN_TO_DEFAULT, | 0,4,0 | |
| RECOVERY_METHOD_RV_GAIN_TO_ZERO | RECOVERY_METHOD_IV_GAIN_TO_ZERO, | 0,4,1 | |
| RECOVERY_METHOD_RV_GAIN_UNDO | RECOVERY_METHOD_IV_GAIN_UNDO, | 0,4,2 | |
| RECOVERY_METHOD_EXTEND_SEEK_TIME_OUT, | 0,5,0 | |

After 128 successful recoveries, success rate is calculated:

| | Table Entry | Success Rate (sort key) |
|---|---|---|
| RECOVERY_METHOD_CLEAR_ACFF_1X | RECOVERY_METHOD_EARLY_ACFF, | 0,2,0 | 80FDFF |
| RECOVERY_METHOD_CLEAR_ACFF_ALL, | 80,2,1 | 80FDFE |
| RECOVERY_METHOD_ACFF_UNDO | RECOVERY_METHOD_EXTEND_SEEK_TIME_OUT, | 0,2,2 | 80FDFD |
| RECOVERY_METHOD_EXTEND_SEEK_TIME_OUT, RECOVERY_METHOD_EXTEND_SEEK_TIME_OUT, | 0,0,0 | FFFF |
| RECOVERY_METHOD_FREE_HEADS, | 0,1,0 | FEFF |
| RECOVERY_METHOD_RV_GAIN_TO_DEFAULT | RECOVERY_METHOD_IV_GAIN_TO_DEFAULT, | 0,3,0 | FCFF |
| RECOVERY_METHOD_RV_GAIN_TO_ZERO | RECOVERY_METHOD_IV_GAIN_TO_ZERO, | 0,4,0 | FBFF |
| RECOVERY_METHOD_RV_GAIN_UNDO | RECOVERY_METHOD_IV_GAIN_UNDO, | 0,4,1 | FBFE |
| RECOVERY_METHOD_EXTEND_SEEK_TIME_OUT, | 0,4,2 | FBFD |
| | 0,5,0 | FAFF |

FIG. 7

Original Seek Recovery Table:

| | Table Entry | Success Rate |
|---|---|---|
| RECOVERY_METHOD_EXTEND_SEEK_TIME_OUT, | 0,0,0 | |
| RECOVERY_METHOD_EXTEND_SEEK_TIME_OUT, | 0,1,0 | |
| RECOVERY_METHOD_CLEAR_ACFF_1X | RECOVERY_METHOD_EARLY_ACFF, | 0,2,0 | |
| RECOVERY_METHOD_CLEAR_ACFF_ALL, | 0,2,1 | |
| RECOVERY_METHOD_ACFF_UNDO | RECOVERY_METHOD_EXTEND_SEEK_TIME_OUT, | 0,2,2 | |
| RECOVERY_METHOD_FREE_HEADS, | 0,3,0 | |
| RECOVERY_METHOD_RV_GAIN_TO_DEFAULT | RECOVERY_METHOD_LV_GAIN_TO_DEFAULT, | 0,4,0 | |
| RECOVERY_METHOD_RV_GAIN_TO_ZERO | RECOVERY_METHOD_LV_GAIN_TO_ZERO, | 0,4,1 | |
| RECOVERY_METHOD_RV_GAIN_UNDO | RECOVERY_METHOD_LV_GAIN_UNDO, | 0,4,2 | |
| RECOVERY_METHOD_EXTEND_SEEK_TIME_OUT, | 0,5,0 | |

After 128 successful recoveries, success rate is calculated:

| | Table Entry | Success Rate (sort key) |
|---|---|---|
| RECOVERY_METHOD_CLEAR_ACFF_1X | RECOVERY_METHOD_EARLY_ACFF, | 0,2,0 | 40FDFF |
| RECOVERY_METHOD_CLEAR_ACFF_ALL, | 40,2,1 | 40FDFE |
| RECOVERY_METHOD_ACFF_UNDO | RECOVERY_METHOD_EXTEND_SEEK_TIME_OUT, | 0,2,2 | 40FDFD |
| RECOVERY_METHOD_RV_GAIN_TO_DEFAULT | RECOVERY_METHOD_LV_GAIN_TO_DEFAULT, | 0,4,0 | 40FBFF |
| RECOVERY_METHOD_RV_GAIN_TO_ZERO | RECOVERY_METHOD_LV_GAIN_TO_ZERO, | 40,4,1 | 40FBFE |
| RECOVERY_METHOD_RV_GAIN_UNDO | RECOVERY_METHOD_LV_GAIN_UNDO, | 0,4,2 | 40FBFD |
| RECOVERY_METHOD_EXTEND_SEEK_TIME_OUT, RECOVERY_METHOD_EXTEND_SEEK_TIME_OUT, | 0,0,0 | FFFF |
| RECOVERY_METHOD_FREE_HEADS, | 0,1,0 | FEFF |
| RECOVERY_METHOD_FREE_HEADS, | 0,3,0 | FCFF |
| RECOVERY_METHOD_EXTEND_SEEK_TIME_OUT, | 0,5,0 | FAFF |

FIG. 8

| | Table Entry |
|---|---|
| Seek recovery table that has been adapted in the previous test | |
| RECOVERY_METHOD_CLEAR_ACFF_1X | RECOVERY_METHOD_EARLY_ACFF , | 0,2,0 |
| RECOVERY_METHOD_CLEAR_ACFF_ALL , | 40,2,1 |
| RECOVERY_METHOD_ACFF_UNDO | RECOVERY_METHOD_EXTEND_SEEK_TIME_OUT , | 0,2,2 |
| RECOVERY_METHOD_RV_GAIN_TO_DEFAULT | RECOVERY_METHOD_LV_GAIN_TO_DEFAULT , | 0,4,0 |
| RECOVERY_METHOD_RV_GAIN_TO_ZERO | RECOVERY_METHOD_LV_GAIN_TO_ZERO , | 40,4,1 |
| RECOVERY_METHOD_RV_GAIN_UNDO | RECOVERY_METHOD_LV_GAIN_UNDO , | 0,4,2 |
| RECOVERY_METHOD_EXTEND_SEEK_TIME_OUT, RECOVERY_METHOD_EXTEND_SEEK_TIME_OUT , | 0,0,0 |
| RECOVERY_METHOD_FREE_HEADS , | 0,1,0 |
| RECOVERY_METHOD_EXTEND_SEEK_TIME_OUT , | 0,3,0 |
| | 0,5,0 |
| Recovery table is restored to default after 10 consecutive recovery failures | |
| RECOVERY_METHOD_EXTEND_SEEK_TIME_OUT , | 0,0,0 |
| RECOVERY_METHOD_EXTEND_SEEK_TIME_OUT , | 0,1,0 |
| RECOVERY_METHOD_CLEAR_ACFF_1X | RECOVERY_METHOD_EARLY_ACFF , | 0,2,0 |
| RECOVERY_METHOD_CLEAR_ACFF_ALL , | 0,2,1 |
| RECOVERY_METHOD_ACFF_UNDO | RECOVERY_METHOD_EXTEND_SEEK_TIME_OUT , | 0,2,2 |
| RECOVERY_METHOD_FREE_HEADS , | 0,3,0 |
| RECOVERY_METHOD_RV_GAIN_TO_DEFAULT | RECOVERY_METHOD_LV_GAIN_TO_DEFAULT , | 0,4,0 |
| RECOVERY_METHOD_RV_GAIN_TO_ZERO | RECOVERY_METHOD_LV_GAIN_TO_ZERO , | 0,4,1 |
| RECOVERY_METHOD_RV_GAIN_UNDO | RECOVERY_METHOD_LV_GAIN_UNDO , | 0,4,2 |
| RECOVERY_METHOD_EXTEND_SEEK_TIME_OUT , | 0,5,0 |

FIG. 9

| Effective recovery setting | Recovery time in default table (ms) | Recovery time after adaptation (ms) |
|---|---|---|
| RECOVERY_METHOD_CLEAR_ACFF_1X | 63.9 | 53.7 |
| RECOVERY_METHOD_FREE_HEADS | 66.8 | 54.7 |
| RECOVERY_METHOD_RV_GAIN_TO_DEFAULT | 67.0 | 53.7 |
| RECOVERY_METHOD_LV_GAIN_UNDO | 75.9 | 63.4 |
| Average seek recovery time saved | | 17.6 % |

FIG. 10

DYNAMIC CONFIGURATION OF SEEK RECOVERY IN A DISK DRIVE

SUMMARY

An apparatus of the present disclosure comprises a controller configured to detect a seek failure of a read/write head. The controller is additionally configured to perform a seek recovery operation in accordance with a recovery sequence in response to the seek failure; the recovery sequence comprising a plurality of recovery procedures. Further, the controller is configured to determine if the seek recovery operation is successful and determine which of the recovery procedures provided the success. And, the controller is configured to dynamically calculate success rate for each recovery procedure, modify the recovery sequence based on the success of the seek recovery operation and based on the success rate calculated for the recovery procedures providing the success.

A method of the present disclosure comprises detecting a seek failure of a read/write head. Then, performing a seek recovery operation in accordance with a recovery sequence in response to the seek failure; the recovery sequence comprising a plurality of recovery procedures. The method further includes determining if the seek recovery operation is successful and determining which of the recovery procedures provided the success. And, dynamically calculating success rate for each recovery procedure, modifying the recovery sequence based on the success of the seek recovery operation and the success rate calculated for the recovery procedures providing the success.

Another apparatus of the present disclosure comprises a controller configured to detect a seek failure of a read/write head. The controller is additionally configured to perform a seek recovery operation in accordance with a recovery sequence in response to the seek failure; the recovery sequence comprising a plurality of recovery procedures. Each of the plurality of recovery procedures is assigned to a group and has a pre-established execution order within that group. Further, the controller is configured to determine if the seek recovery operation is successful and to determine which of the recovery procedures provided the success. And, the controller is configured to dynamically modify the recovery sequence while maintaining the pre-established execution order within the groups. The modification is based on the success of the seek recovery operation and based on the success rate calculated for the recovery procedures providing the success.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Disk drives are data storage and retrieval devices used in various computer systems. During use data is magnetically stored on one or more disks that are rotated at high speed and accessed by a rotary actuator assembly having a plurality of read/write heads that fly adjacent the surfaces of the disks. A read channel and interface circuit are provided to recover previously stored data from the disks to a host. A closed loop servo system provides head positional control using servo data written to the disks during manufacturing.

The servo system carries out two primary operations: seeking and track following. A seek involves moving a selected head from track to track, while track following involves causing the head to follow a particular track. Data reading and writing operations generally occur while the disk drive is in the track following mode. One example of a seek operation provides for a velocity controlled approach wherein a velocity profile, indicative of a desired velocity trajectory for the head, is selected based on the distance between an initial track and a desired, destination track. For a seek of sufficient length, the head is first accelerated to a maximum velocity, maintained at this maximum velocity until it reaches a predetermined distance from the destination track, and then decelerated to settle onto the destination track. Adjustments in the velocity of the head are repetitively made during the seek in relation to the difference between the actual velocity and the desired velocity trajectory of the velocity profile.

Since the various desired velocity values that make up the velocity profile are applied in relation to the number of tracks to go to the destination track, the servo system will keep track of the position of the head as the head crosses each of the intermediate tracks during the seek operation. This may be carried out by transducing the servo data to identify each track crossing as the head is moved toward the destination track. Should the servo system become unable to correctly detect the servo data for any number of reasons, a seek failure will be deemed to have occurred.

Upon failure of a seek operation, a disk drive may be configured to perform a seek recovery operation. In one example of a seek recovery operation, the disk drive sequences through a series of re-seek attempts that have been pre-defined and programmed in a recovery table. The pre-defined sequence is maintained without alteration throughout the life of the disk drive. However, during the life span of a disk drive, which can be many years, the specific step or setting within the recovery table that successfully recovers seek failures can vary from drive to drive. These variations are dependent upon the environment in which the disk drive is operating as well as the health of the disk drive itself. For example, operational vibration, speaker induced vibration, user-induced vibration, drive parameter variations due to excess shock, and/or faulty or aging sensors, may cause differing operational variations in disk drives that result in different successful seek recoveries.

The present disclosure is directed to dynamically adjusting the seek recovery sequence during drive run time according to the operating condition of the disk drive. The dynamic adjustment of the seek recovery sequence is configured to prioritize highly successful seek recovery operations within a seek recovery table and adaptively adjust priorities of each of the seek recovery operations in accordance with variations in drive operation/condition.

Figure 1:
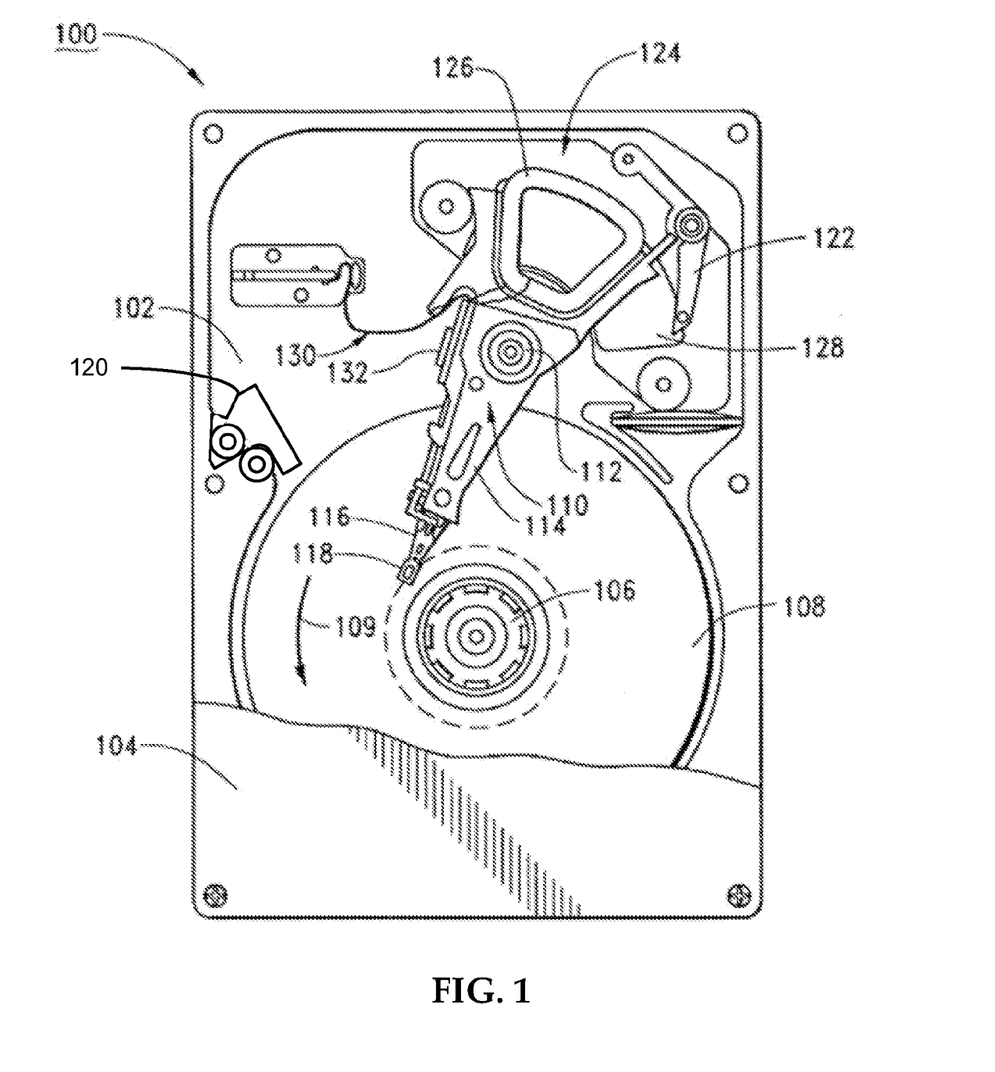
FIG. 1 is an example configuration of a disk drive that may be used to implement the dynamic seek recovery system and method of the present disclosure.

Referring to FIG. 1, an example configuration of a disk drive 100 is illustrated. The disk drive 100 includes a base deck 102 and a top cover 104 (shown in partial cutaway fashion) which cooperate to form a housing in which various components are mounted. A spindle motor 106 rotates a plurality of axially-aligned, magnetic recording disks 108 at a high speed in an angular direction denoted by arrow 109. User data is written to and read from tracks (not designated) on the disks 108 through the use of an actuator assembly 110, which rotates about a bearing shaft assembly 112 adjacent the disks 108. The actuator assembly 110 includes a plurality of rigid actuator arms 114 which support flexible suspension assemblies 116 (flexures). Mounted at the distal end of each of the flexures 116 is a head 118 used to read from and write to the corresponding disk surface.

When the disk drive 100 is not in use, the heads 118 are parked on ramp 120 and the actuator assembly 110 is secured using a magnetic latch assembly 122. The radial position of the heads 118 is controlled with a voice coil motor (VCM) 124 having a coil 126 which interacts with a magnetic circuit that includes a permanent magnet 128. A flex assembly 130 facilitates electrical communication between the actuator assembly 110 and a disk drive printed circuit board (PCB)/controller attached to the underside of the base deck 102. The flex assembly 130 includes a preamplifier/driver circuit 132 (preamp) which applies write currents to the write elements of the heads 118 during a write operation and applies read bias currents to the MR read elements of the heads 118 during a read operation.

Figure 2:
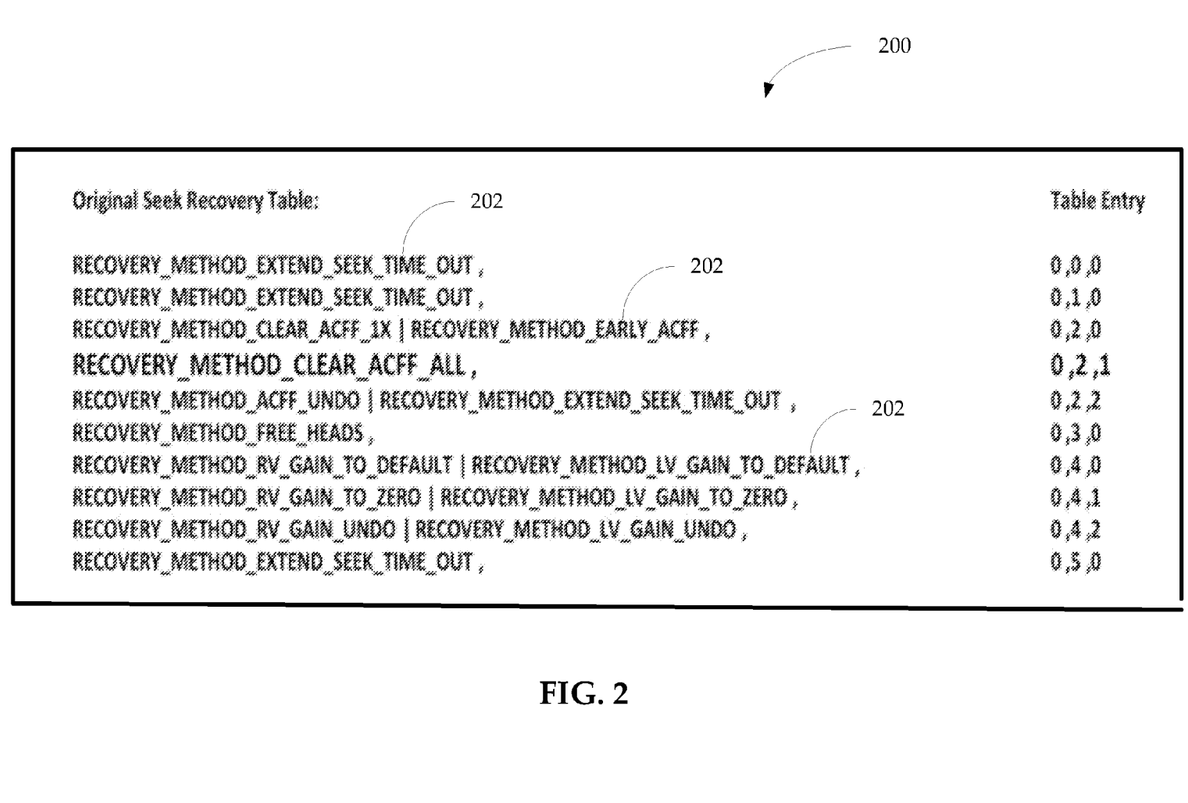
FIG. 2 is an example of an initial recovery table.

The dynamic seek recovery system and method of the present disclosure, which may be utilized in disk drive 100 or other disk drive configurations, is established with an initial recovery table 200, see FIG. 2, that has been programmed into the servo firmware of the disk drive. The initial recovery table 200 is populated with a plurality of seek recovery procedures 202 wherein each procedure is executed before moving to the next seek recovery procedure 202. Each procedure 202 may comprise one instruction or a plurality of instructions; the plurality of instructions may have a defined sequence of execution order. Each of the procedures 202 is assigned to a seek recovery group, which may comprise a single procedure 202 or a plurality of procedures 202; the plurality of procedures within a seek recovery group may have a defined sequence of execution order, e.g., a group member priority.

Figure 3:
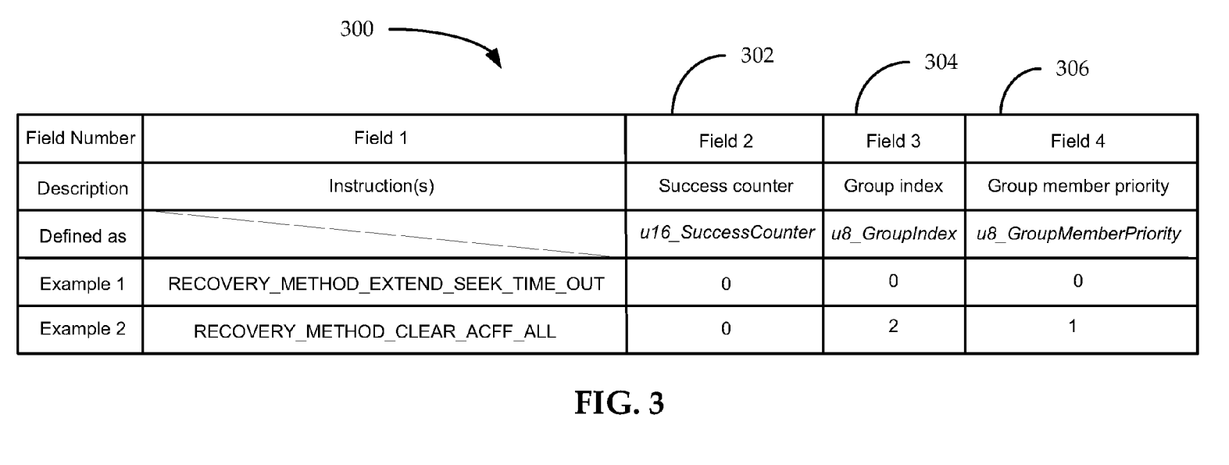
FIG. 3 is an example of a data structure of each entry in the recovery table

Each seek recovery procedure 202 is defined by a 4-field data structure 300, see FIG. 3. Field 1 provides the instruction or plurality of instructions of procedure 202, to modify settings of the on-going re-seek attempt; Field 2 is used as a success counter 302; Field 3 provides a group index 304, and Field 4 provides a group member priority 306. The success counter 302 indicates the number of successful seeks using the associated procedure 202 and may be defined as u16_SuccessCounter. The group index 304 indicates the seek recovery group to which the procedure 202 belongs and may be defined as u8_GroupIndex. And, the group member priority 306 indicates the required procedure sequence within a seek recovery group; for a group having only one procedure, the group member priority 306 is set to zero; for a group having multiple procedures, the group member priority 306 is set to lower value indicating a higher priority. The group member priority may be defined as u8_GroupMemberPriority.

Figure 4:
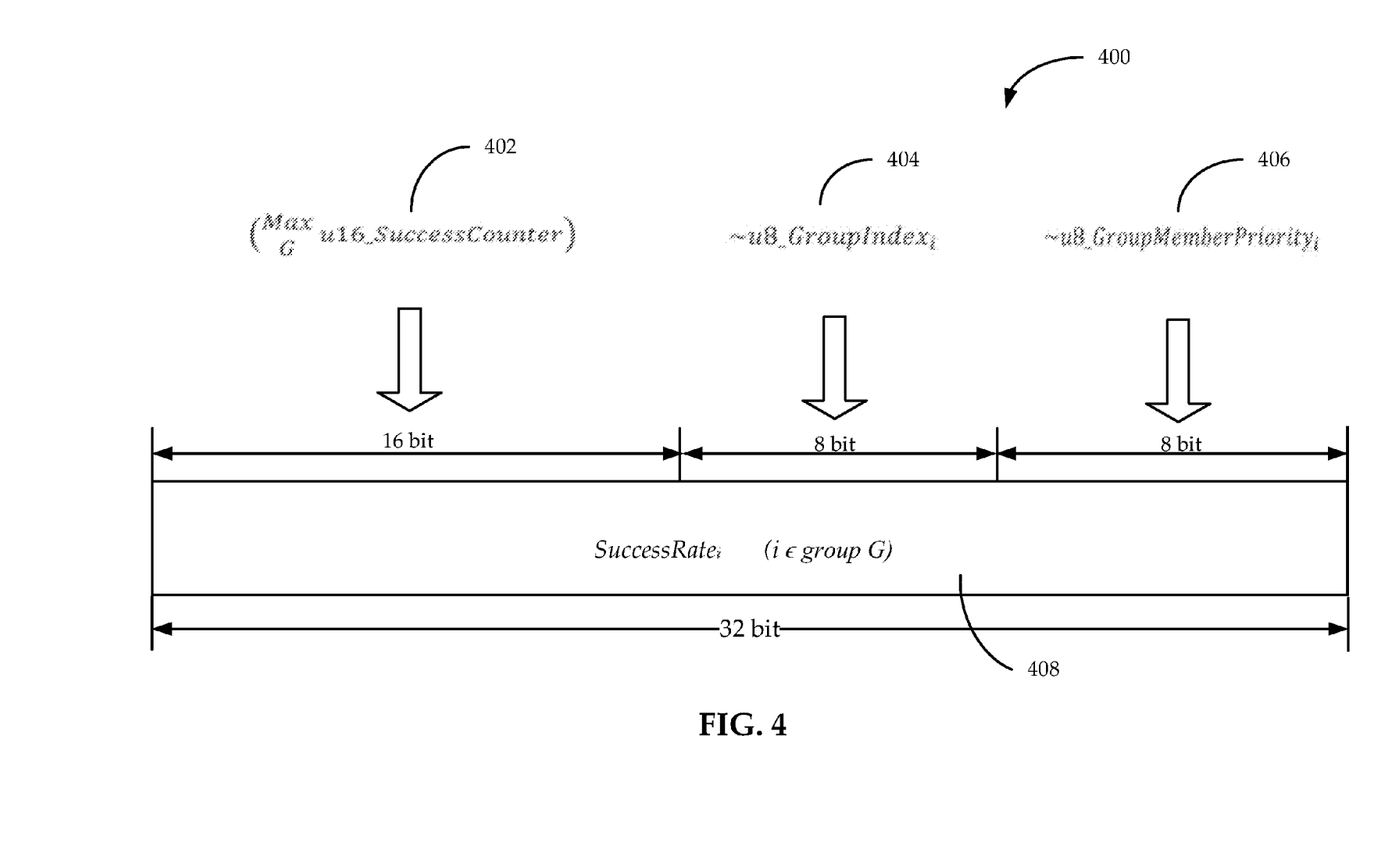
FIG. 4 is an example of a success rate calculation process in accordance with the present disclosure.

Each seek recovery procedure 202 is associated with a success rate 408, which is defined by a 32-bit data, see FIG. 4. After the overall count of successful seek recoveries has reached a specified threshold, the success rate 408 for each associated procedure 202 within the seek recovery table may be calculated following process 400. For any recovery table procedure i belonging to a seek recovery group G, the high 16-bit word 402 of success rate 408 is assigned with the maximum success counter of group G, which is mathematically expressed by ($_G{}^{Max}$ u16_SuccessCounter); the high 8-bit byte 404 of the low word of success rate 408 is assigned with the bit-wise complement of its group index, ~u8_GroupIndex$_i$; the low 8-bit byte 406 of the low word is assigned with the bit-wise complement of its group member priority, ~u8_GroupMemberPriority, where the symbol ~ represents a bit-wise complement operator. The recovery table 200 is then sorted by the calculated success rate 408 being high to low. The success rate calculation process 400 ensures that: (1) the groups with the higher success counter 302 are moved to the top of the recovery table; (2) the groups with lower group index 304 are moved to the top of the recovery table if the success counter 302 is the same; and (3) the group member sequence is arranged according to the pre-defined member priority 306.

An example of the operation of the dynamic recovery system and method 500 incorporating the success rate calculation 400 described above is illustrated in the flowchart of FIG. 5. As shown the controller firmware 502 initiates a servo seek command 504. If the seek is not successful 506, the controller issues a seek recovery 508 command and accesses the seek recovery table. A pointer identifies which re-seek procedure within the seek recovery table is to be executed to attempt the seek recovery. If the pointer has not exceeded the retry limit, e.g., the overall number of times a re-seek may be performed by the system, the system determines whether the magnetic head has established synchronization to servo positional data on disk, i.e. head in sync 512. If the magnetic head is not in sync 512, demod recovery 514 is performed, in which the magnetic head attempts to search for servo positional data on disk and then re-establish synchronization.

Figure 5:
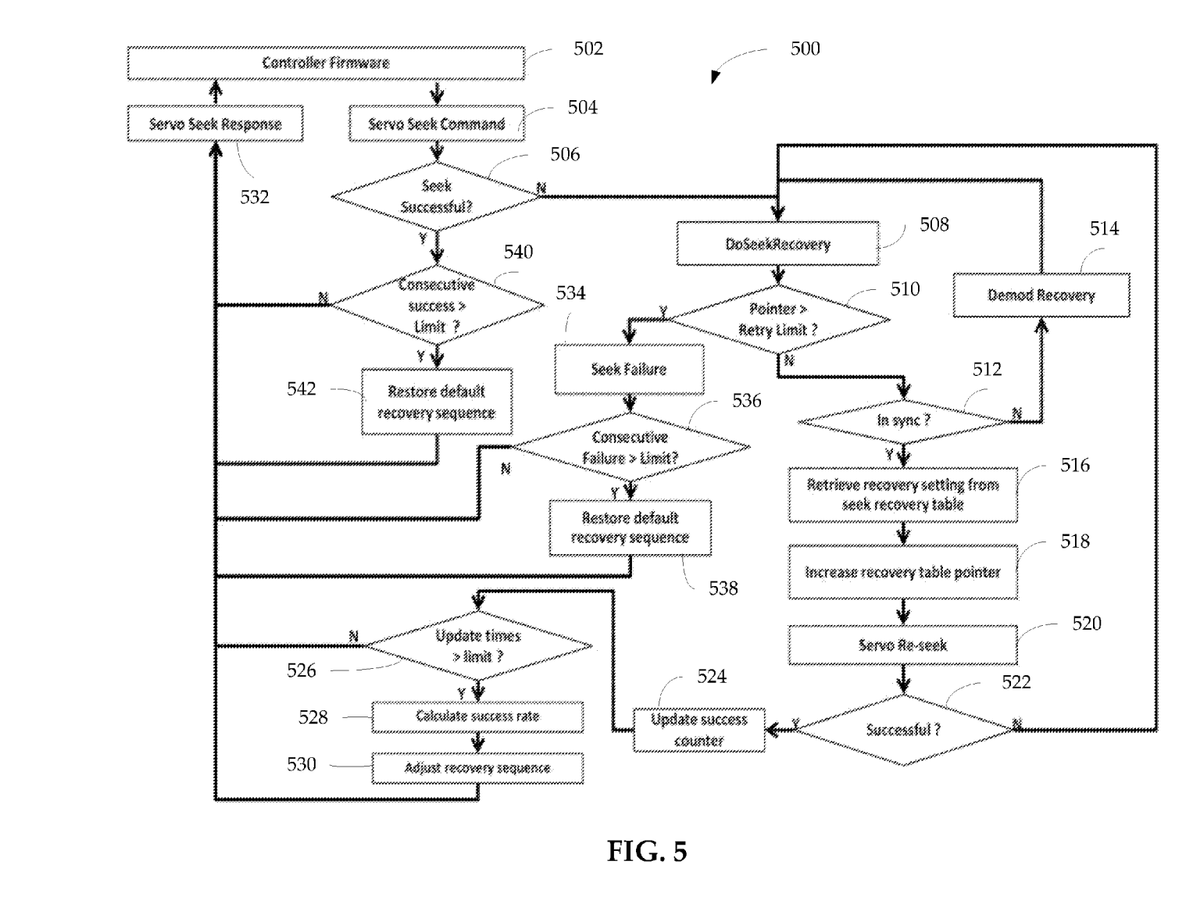
FIGS. 5-6 are flowcharts diagramming methods in accordance with the present disclosure.

If magnetic head is in sync 512, the seek recovery procedure at which the pointer of the seek recovery table is pointing is retrieved 516 and the pointer is incremented to point to the next seek recovery procedure 518. The servo re-seek operation, utilizing the selected procedure from the seek recovery table, is then executed 520. If the servo re-seek operation, e.g., seek recovery operation, is not successful 522, control is returned to function block 508, wherein another seek recovery operation will be attempted with a subsequent re-seek procedure from the seek recovery table.

If the servo re-seek operation is successful 522, the success counter of the corresponding procedure in the recovery table is updated 524. If the overall seek recovery success times exceed a predetermined limit 526, indicating enough successful seek recoveries to statistically calculate success rate for each recovery procedure, then the success rate is calculated 528 following process 400 and the sequence of all the recovery procedures within the recovery table are adjusted 530, as explained earlier, placing recovery procedures in the sequence of success rate being high to low. The servo seek/re-seek response 532 is then provided to the controller firmware 502.

Referring back to the command to perform a seek recovery operation 508, if the pointer of the recovery table has exceeded a retry limit 510, the attempts at seek recovery have failed 534. However, if the number of consecutive seek recovery failures 534 have not exceeded a predetermined limit 536, the servo seek response 532 is provided to the controller firmware 502. If the number of consecutive seek recovery failures have exceeded a predetermined limit 536, a predetermined default sequence of recovery procedures is restored to the recovery table 538 and the servo seek response 532 is provided to the controller firmware 502.

Referring back to the initial servo seek command 504 initiated by the controller firmware 502, if the initial seek is successful, e.g., no re-seek/seek recovery operation is required, the number of consecutive successful seeks is compared to a predetermined limit. If the number of consecutive successful seeks is greater than the limit 540, a predetermined default sequence of recovery procedures is restored to the recovery table 542 and the servo seek response 532 is provided to the controller firmware 502. If the number of consecutive successful seeks is not greater than the limit 540, the servo seek response 532 is provided to the controller firmware 502 and the recovery table restoration is not performed.

After each servo seek response received, controller firmware will check servo seek response, then initiate another servo seek command 504, or report failure to host according to the error recovery algorithm within controller firmware 502.

Figure 6:
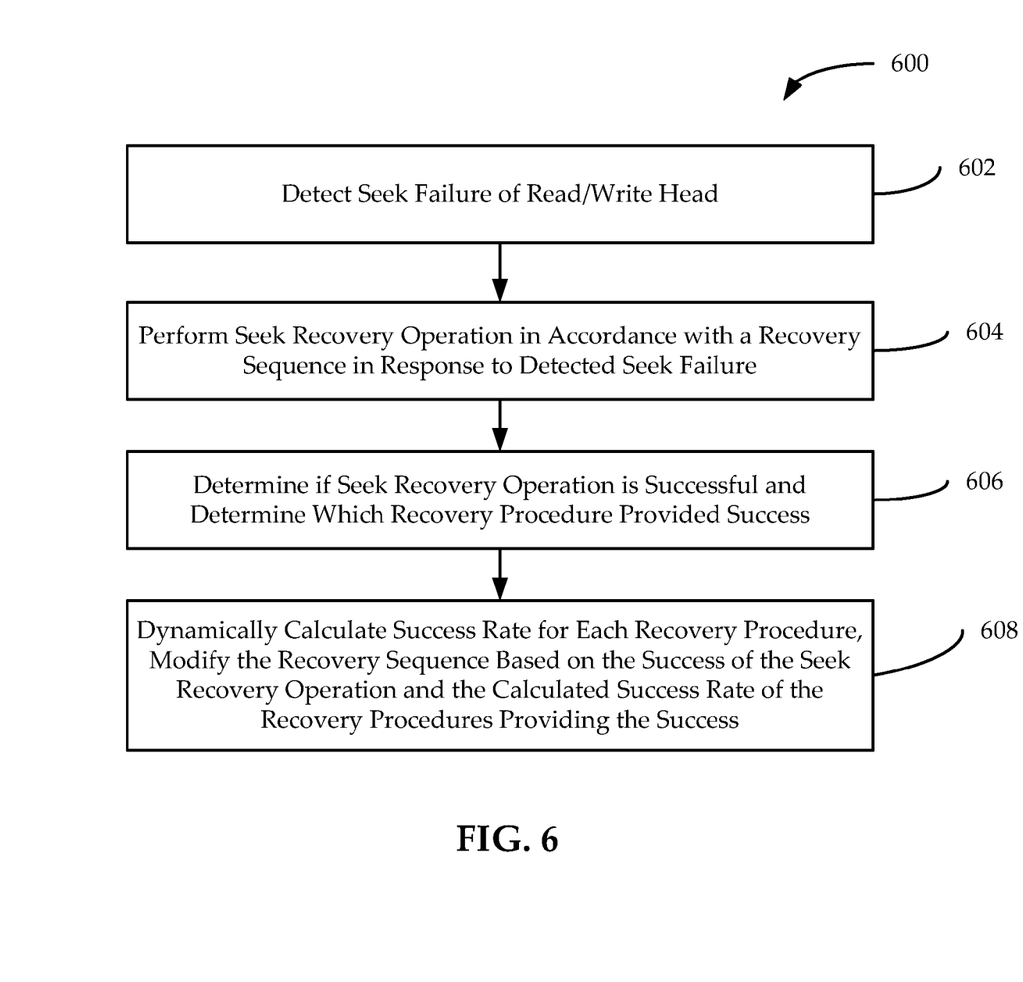

A simplified example of the operation of the dynamic recovery system and method 600 incorporating the success rate calculation described above is illustrated in the flowchart of FIG. 6. As shown, the method 600 includes detecting a seek failure of a read/write head 602. Then, performing a seek recovery operation in accordance with a recovery sequence in response to the seek failure; the recovery sequence comprising a plurality of recovery procedures 604. The method further includes determining if the seek recovery operation is successful and determining which of the recovery procedures provided the success 606. And, dynamically calculating success rate for each recovery procedure, modifying the recovery sequence based on the success of the seek recovery operation and the calculated success rate 608.

Figure 7:
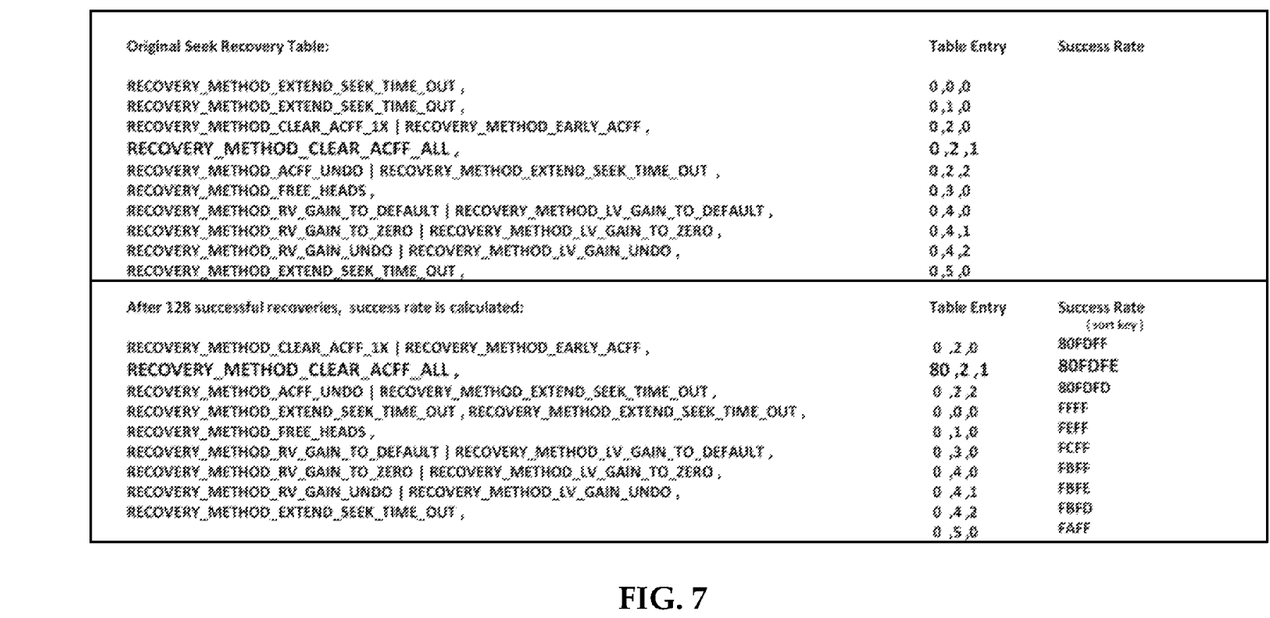
FIG. 7 is a comparison of a recovery table and a dynamically adapted recovery table obtained in accordance with the present disclosure.

The tables of FIG. 7 illustrate the comparison between an original seek recovery table (upper table) and the dynamically adapted seek recovery table (lower table) after successful recoveries using a single successful recovery procedure. To produce the illustrated results a test was performed on a disk drive wherein it was assumed that the only successful recovery table procedure was "RECOVERY_METHOD_ CLEAR_ ACFF_ALL", of which u8_GroupIndex=2 (304) and u8_GroupMemberPriority=1 (306) as defined in the recovery table entry data structure, see FIG. 3. After 128 successful seek recoveries, the success counter of this procedure u16_SuccessCounter 302 is increased to 80 in hexadecimal, i.e. 128 in decimal. The success rate was calculated following process 400 and used as the sort key, as shown in hexadecimal. The sorting with success rate ensures the entire ACFF related recovery group adapted to the top of the recovery table where the group 2 (u8_GroupIndex=2) internal order is unchanged. The success counter values are cleared after adaptation for subsequent recovery statistics.

Figure 8:
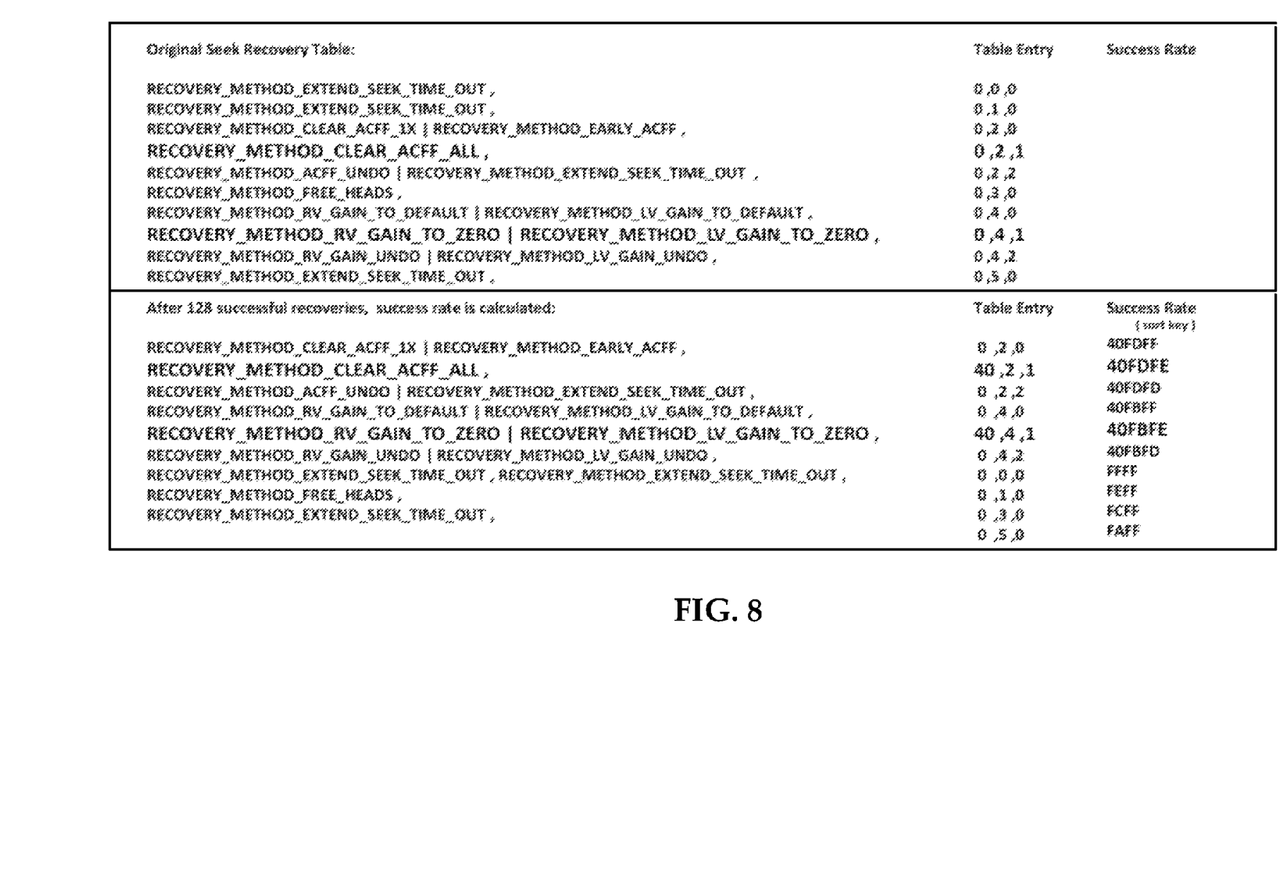
FIG. 8 is a comparison of a recovery table and a dynamically adapted recovery table obtained in accordance with the present disclosure.

The tables of FIG. 8 illustrate the comparison between an original seek recovery table (upper table) and the dynamically adapted seek recovery table (lower table) after successful recoveries with two recovery procedures. To produce the illustrated results a test was performed on a disk drive wherein it was assumed that the effective procedures were, alternatively, "CLEAR_ACFF_ALL" and "RV_GAIN_TO_ZERO". After 128 successful recoveries, success rate of each recovery procedure was calculated. The sorting process ensures the ACFF/RV related recovery groups adapted towards the top of the recovery table. Notice that the maximum success counter for each procedure is the same value '40' in hexadecimal, i.e. 64 in decimal, so the lower group-indexed ACFF group (u8_GroupIndex=2) is on top, followed by the RV recovery group (u8_GroupIndex=4). The internal recovery sequence of the group 2 and group 4 remains unchanged.

Figure 9:
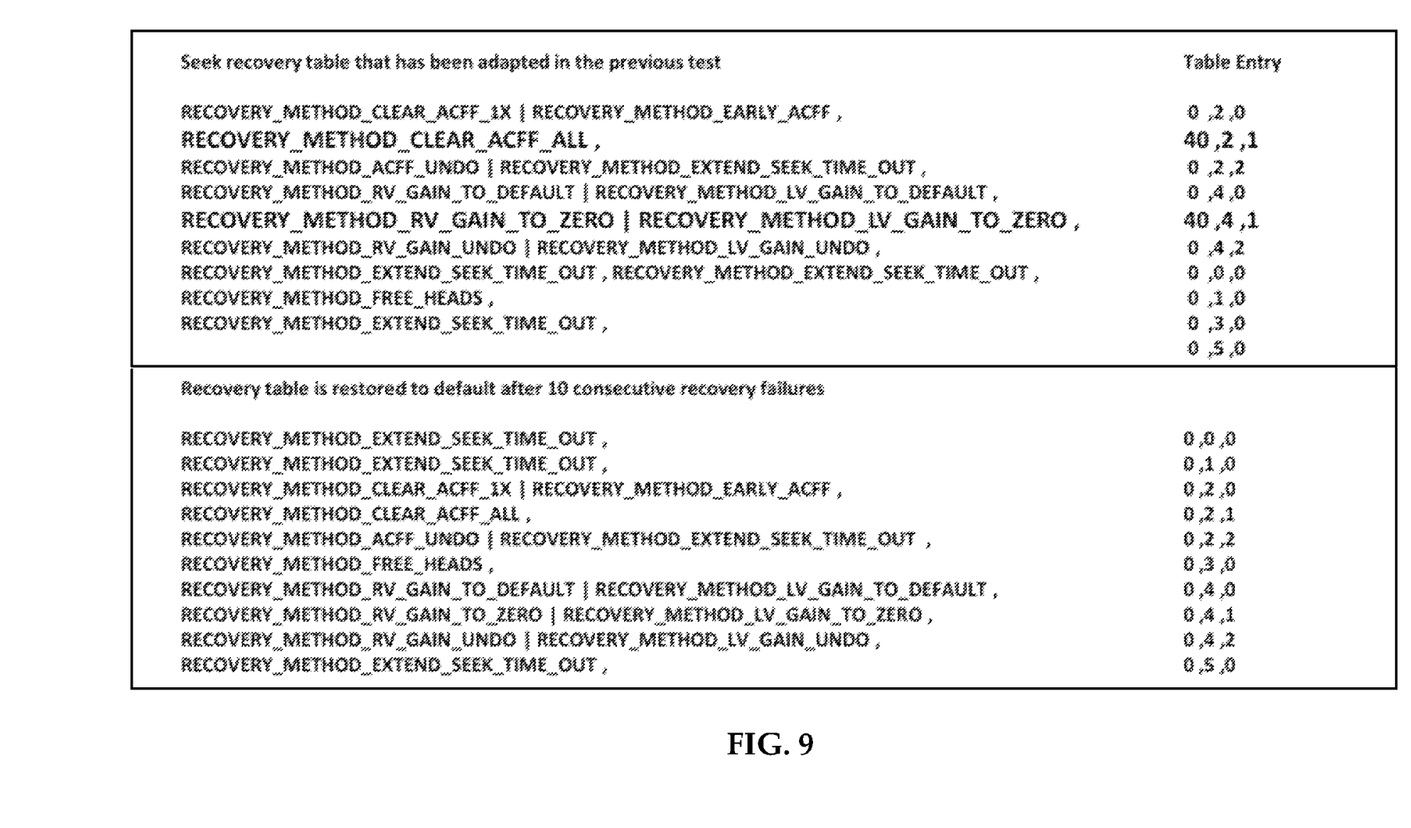
FIG. 9 is a comparison of a dynamically adapted recovery table and a restored default recovery table obtained in accordance with the present disclosure.

The tables of FIG. 9 illustrate the situation of an adapted seek recovery table (upper table) facing consecutive seek recovery failures. To produce the results the dynamically adapted seek recovery table of FIG. 8 was used within the disk drive which was then purposely set to fail on the subsequent ten seek recoveries. As a result, the recovery table (lower table) is restored to the default seek recovery table with all fields reset. In this example of a consecutive recovery failure case, the dynamic adaptation of the recovery table is frozen until the next power cycle. A similar restoration may be performed after $2^{15}$ consecutive seek successes, but with the dynamic adaptation ability still alive.

Figure 10:
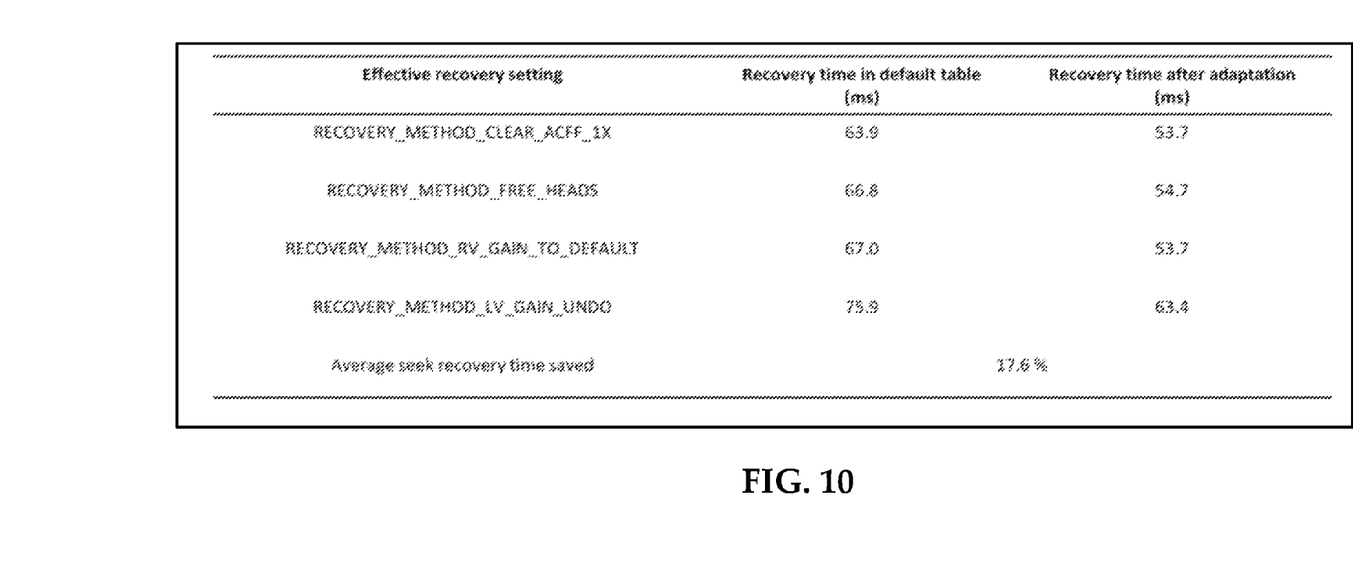
FIG. 10 illustrates the time savings provided by the dynamic seek recovery system and method of the present disclosure.

The table of FIG. 10 illustrates a seek recovery time comparison between a disk drive using a default recovery table and a disk drive using a dynamically adapted recovery table according to a method or system of the present disclosure. To produce the results, each of the drives performed a seek command to mid-diameter of a disk before any measurement. Subsequently, a seek command to the outer-diameter of the disk was initiated but forced to fail at the halfway point (between mid-diameter and outer-diameter) due to timeout until the specified successful seek recovery procedure was executed. The time measurement was estimated by Matlab tic/toc commands applied before and after the seek operations. The measurements show that the dynamic recovery sequence adaptation improves recovery efficiency an average of 17.6%.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus comprising:
a controller configured to:
detect a seek failure of a read/write head;
perform a seek recovery operation in accordance with a recovery sequence in response to the seek failure, the recovery sequence comprising a plurality of recovery procedures;
determine if the seek recovery operation is successful and determine which of the recovery procedures provided the success; and
dynamically calculate success rate of each recovery procedure, modify the recovery sequence based on the success of the seek recovery operation and based on the calculated success rate of recovery procedures providing the success.

2. The apparatus of claim 1, wherein each recovery procedure is assigned to a group.

3. The apparatus of claim 2, wherein the recovery procedures within each group have pre-established execution order.

4. The apparatus of claim 1, wherein at least one of the recovery procedures comprises a plurality of recovery instructions having a pre-established execution order.

5. The apparatus of claim 1, wherein each of the recovery procedures is associated with a data structure having a success counter, a group index and a group member priority.

6. The apparatus of claim 5, wherein the success of the seek recovery operation comprises a success rate calculated from the data structure.

7. The apparatus of claim 1, wherein the controller is additionally configured to restore a default recovery sequence upon the occurrence of a plurality of unsuccessful recovery operations.

8. A method comprising:
detecting a seek failure of a read/write head;
performing a seek recovery operation in accordance with a recovery sequence in response to the seek failure, the recovery sequence comprising a plurality of recovery procedures;
determining if the seek recovery operation is successful and determining which of the recovery procedures provided the success; and
dynamically calculating success rate for each recovery procedure, modifying the recovery sequence based on the success of the seek recovery operation and based on success rate of the recovery procedures providing the success.

9. The method of claim 8, wherein each recovery procedure is assigned to a group.

10. The method of claim 9, wherein the recovery procedures within each group have pre-established execution order.

11. The method of claim 8, wherein at least one of the recovery procedures comprises a plurality of recovery instructions having a pre-established execution order.

12. The method of claim 8, wherein each of the recovery procedures is associated with a data structure having a success counter, a group index, and a group member priority.

13. The method of claim 12, wherein the success of the seek recovery operation comprises a success rate calculated from the data structure.

14. The method of claim 8, further comprising restoring a default recovery sequence upon the occurrence of a plurality of unsuccessful recovery operations.

15. An apparatus comprising:
a controller configured to:
detect a seek failure of a read/write head;
perform a seek recovery operation in accordance with a recovery sequence in response to the seek failure, the recovery sequence comprising a plurality of recovery procedures, wherein each of the plurality of recovery procedures is assigned to a group and has a pre-established execution order within the group;
determine if the seek recovery operation is successful and determine which of the recovery procedures provided the success; and
dynamically modify the recovery sequence while maintaining the pre-established execution order within the group, the modification based on the success of the seek recovery operation and based on the success rate of recovery procedures providing the success.

16. The apparatus of claim 15, wherein at least one of the recovery procedures comprises a plurality of recovery instructions having the pre-established execution order.

17. The apparatus of claim 16, wherein dynamically modifying the recovery sequence is performed while maintaining the pre-established execution order of the plurality of recovery instructions.

18. The apparatus of claim 15, wherein each of the recovery procedures is associated with a data structure having a success counter, a group index, and a group member priority.

19. The apparatus of claim 18, wherein the success of the seek recovery operation comprises a success rate calculated from the data structure.

20. The apparatus of claim 15, further comprising restoring a default recovery sequence upon the occurrence of a plurality of unsuccessful recovery operations.

* * * * *